Jan. 25, 1966             C. JONES             3,230,789
ROTOR CONSTRUCTION FOR ROTARY MECHANISMS
Filed March 26, 1962             3 Sheets-Sheet 1
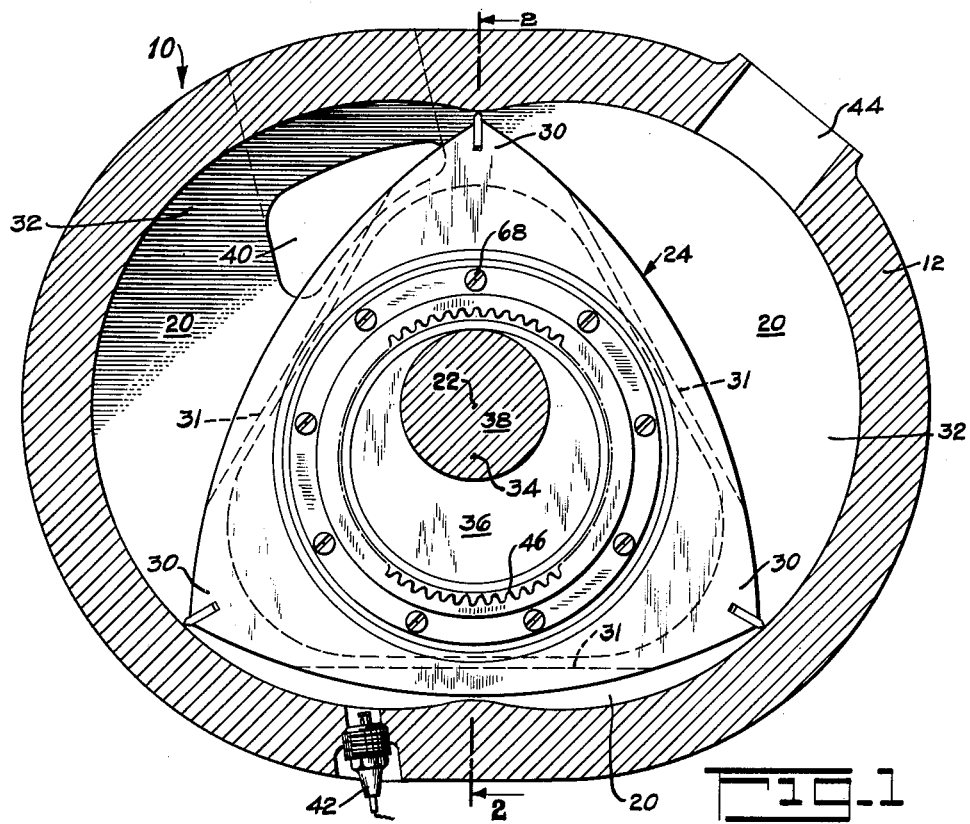
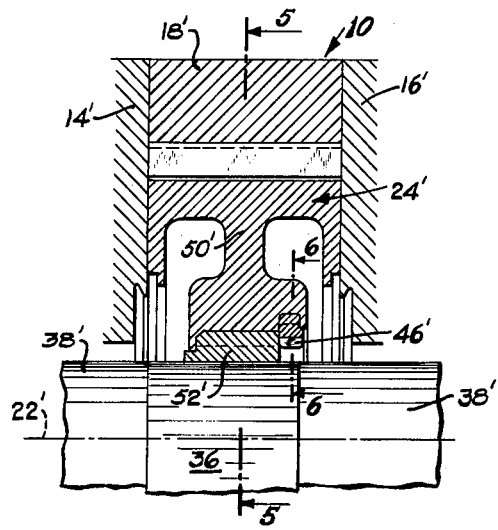
INVENTOR.
CHARLES JONES
BY
*William V. Ebs*
ATTORNEY Jan. 25, 1966  C. JONES  3,230,789
ROTOR CONSTRUCTION FOR ROTARY MECHANISMS
Filed March 26, 1962  3 Sheets-Sheet 2

INVENTOR.
CHARLES JONES
BY
William V. Ebs
ATTORNEY

Jan. 25, 1966   C. JONES   3,230,789
ROTOR CONSTRUCTION FOR ROTARY MECHANISMS
Filed March 26, 1962   3 Sheets-Sheet 3

INVENTOR.
CHARLES JONES
BY
William V. Ebs
ATTORNEY

United States Patent Office 3,230,789
Patented Jan. 25, 1966

3,230,789
ROTOR CONSTRUCTION FOR ROTARY MECHANISMS
Charles Jones, Paramus, N.J., assignor to Curtiss-Wright Corporation, a corporation of Delaware
Filed Mar. 26, 1962, Ser. No. 182,451
9 Claims. (Cl. 74—431)

My invention relates to rotor constructions for rotary mechanisms. More particularly the invention is directed to a rotor which is both light in weight and has good heat conducting properties.

The rotor of the invention is useful in almost any type of rotary mechanism which operates at an elevated temperature, including fluid motors, fluid pumps, compressors, and the like. It is particularly useful, however, in rotating combustion engines and is described herein in the environment of a rotary combustion engine of the type disclosed in Patent No. 3,111,261 for Rotor and Bearing Construction for Rotary Mechanisms issued November 19, 1963.

Such rotary combustion engines comprise an outer body having axially-spaced end walls interconnected by a peripheral wall to form a cavity therebetween and an inner body or rotor received within said cavity between the cavity end walls. The inner surface of said peripheral wall preferably is parallel to the axis of said cavity and, as viewed in a plane transverse to said axis, said inner surface has a multi-lobed profile which preferably is an epitrochoid. The axis of said rotor is parallel to but spaced from the axis of the outer body cavity and said rotor has axially-spaced end faces disposed adjacent to said outer body end walls and also has a plurality of circumferentially-spaced apex portions. The rotor is rotatable relative to the outer body such that said apex portions continuously engage the inner surface of said peripheral wall to form a plurality of working chambers between said rotor peripheral wall which vary in volume, during engine operation, as a result of relative rotation of said rotor and outer body. Such engines also include an intake port for admitting a fuel-air mixture to said chambers, an exhaust port for said chambers and suitable ignition means such that during engine operation the working chambers of the engine have a cycle of operation which includes the four phases of intake, compression, expansion and exhaust. As described in said copending application this cycle of operation is achieved as a result of the relative rotation of said inner rotor and outer body and for this purpose both said inner rotor and outer body may rotate or one, preferably the inner rotor, may rotate while the outer body is stationary.

For efficient operation of the engine, its working chambers should be sealed and therefore an effective seal should be provided between each rotor apex portion and the inner surface of the peripheral wall of the outer body as well as between the end faces of the inner rotor and the end walls of the outer body.

It is desirable to use an aluminum alloy, magnesium or other lightweight material having good heat conducting properties in the construction of a rotor for a rotary combustion engine such as described and in other rotary mechanisms operating at high temperature. Generally, however, it is not feasible to form the entire rotor of such a material because of the necessity of maintaining a substantially constant bearing clearance for the rotor. If an aluminum rotor, for example, was used, the bearing clearance would open up at elevated temperatures due to the high thermal coefficient of expansion of aluminum and prevent successful operation. A multi-part construction is, therefore, employed in the rotor of the invention. Such rotor comprises an outer part of a lightweight material, having good heat conducting properties such as aluminum and an inner part of a material having a relatively low thermal coefficient of expansion such as steel held in assembled relationship by interlocking splines with very close-fitting side surfaces which extend across a major portion of the axial width of the rotor at the splines. Clearances between the side surfaces of adjacent splines sufficient to permit independent growth of the outer and inner parts of the rotor due to different thermal coefficients of expansion but of the order of any a few ten thousandths of an inch are established, whereby a substantially constant rotor bearing clearance is provided for, the inner bearing part is accurately centered in the outer part of the rotor and impact loading on the interlocking splines is minimized. The required fit is established by first forming the annular iner bearing part with circumferentially spaced splines around the periphery and then casting the outer part of the rotor on the formed inner part. Alternately, the desired fit may be established by forming the annular inner part with splines, each of which has a cutting edge at one end and forcing the inner part into an outer part which has been formed with splines so spaced that the side surfaces thereof are shaved as the inner part advances into the outer part. The side surfaces of the interlocking splines are formed to extend radially with respect to the rotor axis, since with the radially extending side surfaces the fit between such side surfaces of the interlocking splines is unaffected by differential expansion of the outer and inner parts of the rotor.

It is an object of the invention to provide an improved multi-part rotor for rotary mechanisms so constructed that the structural integrity of engaging portions of the rotor is preserved and efficent co-operation between such rotor portions as well as between the rotor and other parts of the rotary mechanism is assured.

It is a further object of the invention to provide improved methods of making such a multi-part rotor.

Referring to the drawings:

FIG. 1 is a side elevation of a rotary combustion engine having the end wall of the outer body removed and showing a rotor construction according to the invention;

FIG. 4 is a partial longitudinal vertical sectional view showing a modified rotor construction;

Figure 2:
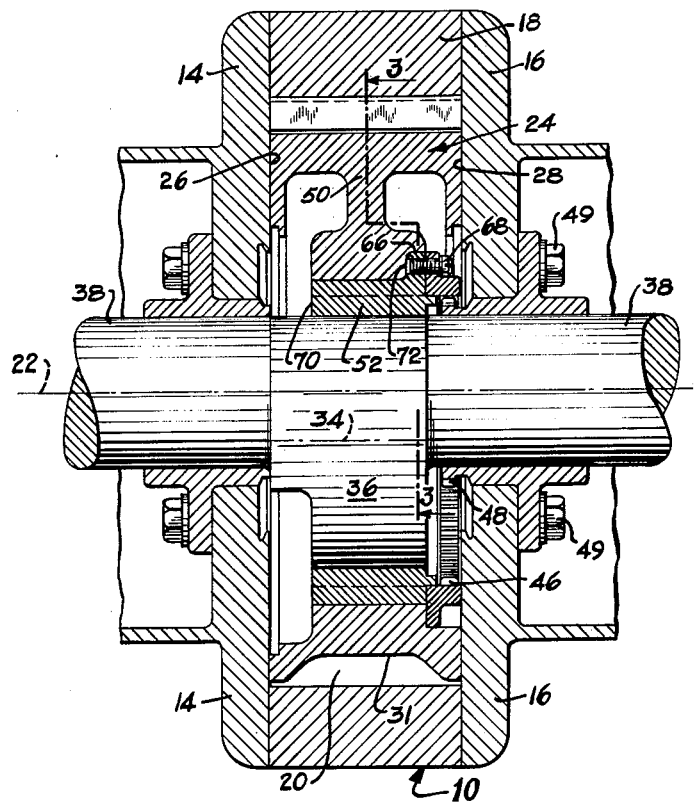
FIG. 2 is a sectional view taken on the plane of the line 2—2 of FIG. 1.
Figure 3:
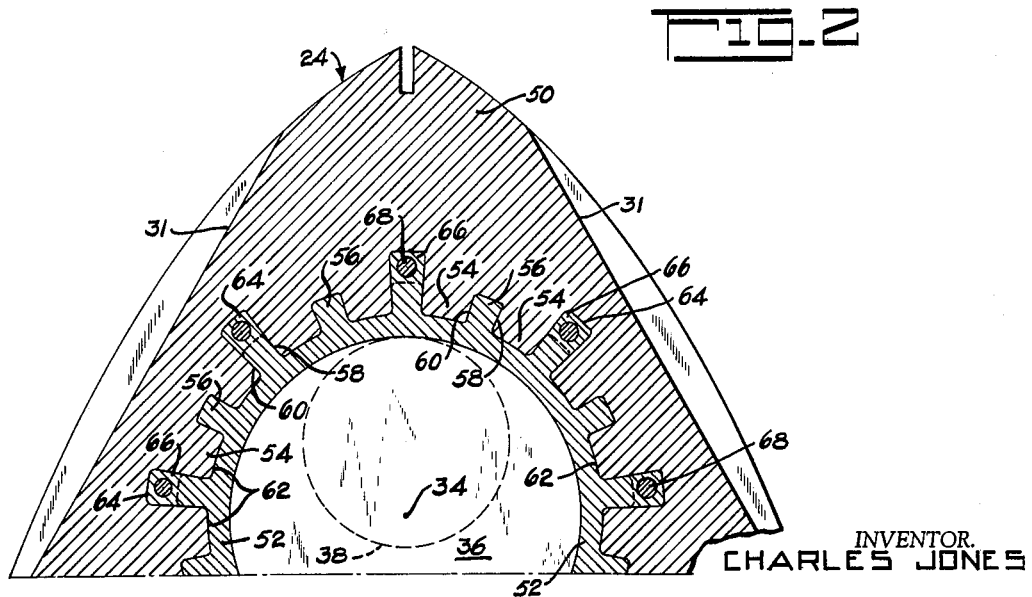
FIG. 3 is a partial sectional view of the rotor of the engine of FIGS. 1 and 2 taken on the plane of the line 3—3 of FIG. 2.

Referring to FIGS. 1, 2 and 3 reference character 10 designates a rotary internal combustion engine. Said engine 10 comprises an outer body 12 having axially-spaced end walls 14 and 16 with a peripheral wall 18 connected therebetween to form a cavity 20 which, as viewed in a plane (FIG. 1) transverse to the axis 22 of the cavity 20, has a multi-lobed profile. In the specific embodiment illustrated, said cavity profile has two lobes although the engine is not limited to this specific number of lobes.

A rotor 24 is disposed within the cavity 20 of the outer body 12. The inner rotor has axially-spaced end faces 26 and 28 disposed adjacent to the outer body end walls 14 and 16. In addition, the inner rotor has a plurality of circumferentially-spaced apex portions 30 which, as explained in said aforementioned application, preferably are one more in number than the number of lobes of the cavity 20. As illustrated, the rotor 24 has three apex portions 30 and the periphery of the rotor has a generally triangular profile. The apex portions of the rotor carry radially movable members which seal against the inner surface of the peripheral wall 18 to form a plurality (three as illustrated) of working chambers 32 between the inner rotor 24 and outer body 12. Each working chamber 32 includes a trough 31 formed in the adjacent peripheral face of the rotor 24, each said trough forming a substantial part of the combustion space during combustion in said chamber. The geometrical axis 34 of the rotor 24 is offset from and is disposed parallel to the axis 22 of the outer body.

In the engine 10 illustrated, the outer body 12 is stationary while the inner rotor 24 is journaled on an eccentric portion 36 of a shaft 38, the axis of said shaft being co-axial with that of the cavity 20 of said outer body. Upon rotation of the inner rotor 24 relative to the outer body 12 the working chambers 32 vary in volume. An intake port 40 is provided in one or both end walls 14 and 16 for admitting air and fuel into the working chambers, a spark plug 42 is provided for igniting the combustion mixture and an exhaust port 44 is provided in the peripheral wall for discharge of the exhaust gases from the working chambers 32. As more fully explained in aforementioned copending application, during engine operation the working chambers 32 have a cycle of operation including the four phases of intake, compression, expansion and exhaust, said phases being similar to the strokes in a reciprocating-type internal combustion engine having a four-stroke cycle. In order to maintain the relative motion of the rotor 24 relative to the stationary outer body an internal gear 46 is, as illustrated, co-axially secured to the rotor and is disposed in mesh with a fixed gear 48 secured to the outer body by bolts 49, said fixed gear being co-axial with the shaft 38. The gears 46 and 48 are formed of a material which is both durable and has a low thermal coefficient of expansion such as steel. As also explained in said copending application, the outer body 12, as well as the body 24, may rotate instead of, as in the embodiment illustrated, only one of said bodies rotating.

The rotor 24 includes an outer part 50 made of an aluminum alloy or other lightweight material having good heat conducting properties, and an inner bearing part 52 of steel or other suitable material having a relatively low thermal coefficient of expansion. In accordance with the invention, the outer and inner parts 50 and 52 are held in assembled relationship by interlocking splines 54 and 56 respectively which extend a substantial distance axially. Such splines should preferably extend axially substantially the entire length of bearing part 52 or at least for a major portion of the length of such part to provide for an extensive distribution of forces acting between the outer and inner parts. A very close fit is established at 58 and 60 between the side faces of the interlocking splines whereby any substantial relative rotational movement between the outer part 50 and bearing part 52, and the wear which would result therefrom is prevented, and whereby the bearing part 52 is accurately centered in outer part 50. In order to preserve this fit during operation of the engine, despite unequal expansion of the outer and inner parts due to their having different thermal coefficients of expansion, the side faces of the splines are formed to extend radially with respect to the rotor axis. The radial side faces serve to maintain the tight fit because the parts expand in radial directions. The splines are also preferably formed to provide a close fit between opposite faces at roots and extremities of the splines as at 62 and 64 when the engine is at ambient temperatures. Expansion of the outer part 50 of the rotor relative to inner part 52 as the engine heats up results in the creation of some radial clearance between the splines, but this is not detrimental to the structural integrity of the composite rotor.

As shown, alternate splines around the inner bearing part 52 include radially extended portions 66 at one end which interlock with corresponding extended portions of the female splines 54 on the outer part of the rotor. Such extended portions 66 on alternate splines on the inner part 52 facilitate attachment of gear 46 to the inner part of the rotor, the gear being secured thereto by the bolts 68 which extend into the projecting portions 66 of the splines.

Preferably the rotor 24 is constructed by first forming the inner bearing part 52 to proper dimensions and thereafter casting the outer part 50 on the inner part. The outer bearing part is formed utilizing conventional techniques which involve suitably positioning the inner bearing 52 in a mold to form a cavity between the inner part and walls of the mold having the shape desired for the outer part; and thereafter pouring the molten metal from which the outer part is to be formed into the mold cavity, and permitting the molten metal to solidify. The outer part splines 54 are formed between the splines 56 of the inner part in this way and the result is a very close fit between outer and inner parts at the splines. The radially extending side surfaces of the splines on the inner part, as well as the roots and extremities of such splines, should be coated with a parting compound prior to the casting of the outer part to prevent fusion of the material of the outer part of the rotor during casting to the inner part, for as already indicated, the outer part must be capable of expanding freely relative to the inner part.

Instead of casting the outer part 50 of the rotor 24 on the inner part 52 to establish a very close fit between side surfaces of interlocking splines, the close fit may established in an alternate way. In carrying out the alternate method of producing a close fit, the inner part is formed to final dimensions with cutting edges at one end 70 of the splines 56, whereas the outer part is formed with splines 54 which are oversize, the dimensions of splines 54 being such that at least the side surfaces must be cut back a few thousandths of an inch to accommodate the splines on the inner part 52. The inner part 52 is then forced with the cutting edges 70 leading into the outer part 50 until a final desired assembled position for the inner part is reached. As the inner part advances into the outer part the cutting edges on the inner part shave the surfaces of the splines on the outer part to final size. A very close fit between the side surfaces of the splines of the inner and outer parts is established in this manner without the necessity of machining any part to very close tolerance such as would otherwise be required to obtain the desired fit. The splines 56 and 54 are not provided with extended portions at the end of the rotor to which the gear attaches as shown in FIGS. 1–3 when the alternate method of establishing the close fit is employed.

Figure 5:
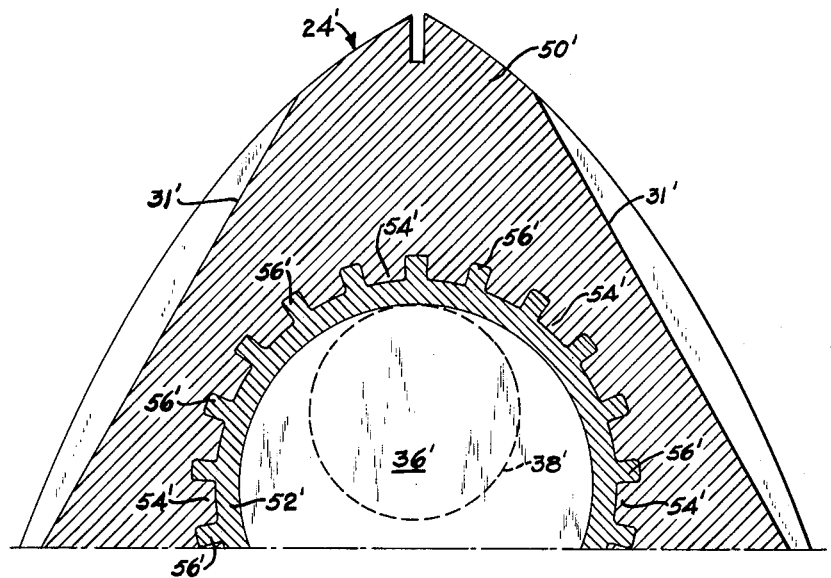
FIG. 5 is partial sectional view of the rotor of FIG. 4 taken on the plane of the line 5—5 of FIG. 4.
Figure 6:
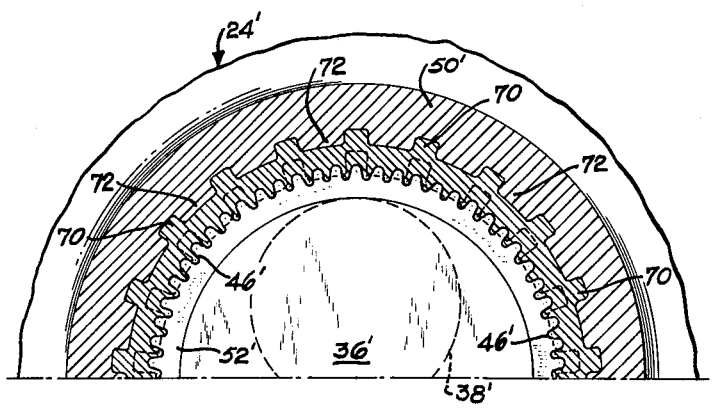
FIG. 6 is a partial sectional view of the rotor of FIG. 4 taken on the plane of the line 6—6 of FIG. 4.

FIGS. 4, 5 and 6 illustrate a modification of the rotor construction shown in FIGS. 1, 2 and 3. Parts in FIGS. 4–6 corresponding to parts in FIGS. 1–3 are designated by the same reference characters, but with a prime mark (′) added thereto. As may be seen from the drawings the rotor construction of FIGS. 4–6 is generally similar to the rotor construction of FIGS. 1–3. The outer part 50′ of the rotor and inner bearing part 52′, for example, are held in assembled relationship by interlocking splines 54′ and 56′ having radial sides as in the construction already described. In the modified construction of FIGS. 4–6 however, the rotor ring gear which is designated by reference character 46′ is splined to the rotor outer part bearing reference character 50′ instead of being secured to the inner bearing part of the rotor. As shown, the rotor outer part 50′ and ring gear 46′ are held in assembled relationship by interlocking splines, that is, splines 70 on the gear 46′ and splines 72 on part 52′. The outer part 50′ of the rotor may be conveniently cast on the inner bearing part 52′ and ring gear 46′. The outer part 50′ which is formed of aluminum or a similar lightweight material having a relatively high thermal coefficient of expansion can expand independently of both the inner part 52' which is formed of steel or other suitable material having a relatively low thermal coefficient of expansion and the gear 46' which is formed of steel or other material which is both durable and has a relatively low thermal coefficient of expansion. Because of the relatively slight expansion of the gear and because of the close fit established between mating splines as by the casting technique which results in the rotor inner part and gear being accurately centered in the rotor outer part substantially, constant tooth clearance can be maintained between the rotor gear 46' and the fixed gear of the engine with which gear 46' is intended to co-operate whereby such gears can accurately perform their function of guiding the rotor through a true trochoidal path around the rotor housing.

While more than one form of the invention has been disclosed, it will nevertheless be apparent to those skilled in the art that still other forms might be devised incorporating the features of the invention, and that various changes and modifications might be made in the constructions without departing from the spirit and scope of the invention.

What is claimed is:

1. A rotor for use in a rotary mechanism having an outer body comprising a pair of spaced end walls and an interconnecting peripheral wall to form a cavity therebetween within which said rotor is rotatably received for co-operation with the inner surface of the cavity to form a plurality of working chambers between the rotor and outer body which vary in volume upon rotation of the rotor relative to the outer body; said rotor having a multi-part construction comprising an annular inner part of a material having a relatively low thermal coefficient of expansion and including a plurality of circumferentially-spaced elements having side surfaces which extend radially with respect to the rotor axis, and an outer part of a material having a relatively high coefficient of expansion cast on said inner part to form circumferentially-spaced elements on the outer part, between the elements on said inner part and with radially extending side surfaces in close fitting relationship to the side surfaces of the elements on said inner part whereby substantially fixed relative rotational positions are determined for the inner and outer parts and the inner part is accurately centered in the outer part.

2. A rotor as defined in claim 1 wherein said inner part is a bearing sleeve.

3. A rotor as defined in claim 1 wherein the said circumferential elements of the outer and inner parts of the rotor extend parallel to the rotor axis for at least a major portion of the width of the inner part of the rotor.

4. A rotor as defined in claim 2 including an internally toothed gear secured to said sleeve.

5. A rotor as defined in claim 1 wherein the inner and outer parts are steel and aluminum alloy respectively.

6. A rotor for use in a rotary mechanism having an outer body comprising a pair of spaced end walls and an interconnecting peripheral wall to form a cavity therebetween within which said rotor is rotatably received for co-operation with the inner surface of the cavity to form a plurality of working chambers between the rotor and outer body which vary in volume upon rotation of the rotor relative to the outer body; said rotor having a multi-part construction comprising an annular inner part of a material having a relatively low thermal coefficient of expansion and including a plurality of circumferentially-spaced elements having side surfaces which extend radially with respect to the rotor axis, and an outer part of a material having a relatively high thermal coefficient of expansion with circumferentially-spaced elements having radially extending side surfaces formed thereon by the elements on said inner part to establish a close fitting relationship between side surfaces of the elements on the inner and outer parts whereby substantially fixed relative rotational positions are determined for said inner and outer parts and the inner part is accurately centered in the outer part.

7. A rotor for use in a rotary mechanism having an outer body comprising a pair of spaced end walls and an interconnecting peripheral wall to form a cavity therebetween within which said rotor is rotatably received for co-operation with the inner surface of the cavity to form a plurality of working chambers between the rotor and outer body which vary in volume upon rotation of the rotor relative to the outer body; said rotor having a multi-part construction comprising an annular inner part of a material having a relatively low thermal coefficient of expansion and including a plurality of circumferentially-spaced elements, and an outer part of a material having a relatively high coefficient of expansion with circumferentially-spaced elements formed thereon by the elements on said inner part to establish a close fit between side surfaces of the elements on the inner and outer parts.

8. A rotor as defined in claim 7 wherein said inner part is a bearing sleeve and including an internally toothed gear secured to one of the said rotor parts.

9. A rotor as defined in claim 7 wherein the said circumferential elements of the outer and inner parts of the rotor extend parallel to the inner part of the rotor axis for at least a major portion of the width of the rotor.

References Cited by the Examiner

UNITED STATES PATENTS

| | | | |
|---|---|---|---|
| 2,260,593 | 10/1941 | Wittlinger | 22—202 |
| 2,948,033 | 8/1960 | Gulick | 22—202 |
| 3,026,811 | 3/1962 | Van Beuning | 103—130 |
| 3,059,585 | 10/1962 | Froede | 103—130 |

DON A. WAITE, *Acting Primary Examiner.*

LAWRENCE V. EFNER, *Examiner.*